(12) United States Patent
Seppä

(10) Patent No.: US 6,819,246 B1
(45) Date of Patent: Nov. 16, 2004

(54) METHOD AND APPARATUS FOR CONVERTING ELECTROMAGNETIC ENERGY OF OBJECTS

(75) Inventor: Heikki Seppä, Helsinki (FI)

(73) Assignee: Valtion Teknillinen Tutkimuskeskus, Vtt (FI)

( * ) Notice: Subject to any disclaimer, the term of this patent is extended or adjusted under 35 U.S.C. 154(b) by 0 days.

(21) Appl. No.: 09/980,860

(22) PCT Filed: Jun. 5, 2000

(86) PCT No.: PCT/FI00/00499

§ 371 (c)(1),
(2), (4) Date: Jan. 7, 2002

(87) PCT Pub. No.: WO00/75688

PCT Pub. Date: Dec. 14, 2000

(30) Foreign Application Priority Data

Jun. 8, 1999 (FI) .................................................. 991307
May 19, 2000 (FI) .............................................. 20001214

(51) Int. Cl.[7] ............................................. G03B 13/14
(52) U.S. Cl. ................................. 340/572.7; 340/512.3; 340/572.1; 340/10.1; 340/10.3; 340/10.4; 310/313 A; 310/313 B; 310/313 C; 310/313 D
(58) Field of Search ....................... 340/572.7, 572.3, 340/572.1, 10.1, 10.3, 10.4; 310/313 A, 313 B, 313 C, 313 D

(56) References Cited

U.S. PATENT DOCUMENTS

| | | | | |
|---|---|---|---|---|
| 4,746,830 A | * | 5/1988 | Holland | 310/313 D |
| 5,450,492 A | * | 9/1995 | Hook et al. | 380/28 |
| 5,469,170 A | * | 11/1995 | Mariani | 342/51 |
| 5,508,667 A | * | 4/1996 | Kondratiev et al. | 333/194 |
| 5,563,583 A | | 10/1996 | Brady et al. | 340/572 |
| 5,610,566 A | * | 3/1997 | Chen et al. | 333/194 |
| 5,691,698 A | * | 11/1997 | Scholl et al. | 340/572.5 |
| 5,734,326 A | * | 3/1998 | Skudera, Jr. | 340/572.1 |
| 5,734,332 A | * | 3/1998 | Kirknes | 340/10.31 |
| 5,812,065 A | | 9/1998 | Schrott et al. | 340/825.54 |
| 6,060,815 A | * | 5/2000 | Nysen | 310/318 |
| 6,121,892 A | * | 9/2000 | Reindl et al. | 340/5.8 |

* cited by examiner

Primary Examiner—Daniel J. Wu
Assistant Examiner—Tai T. Nguyen
(74) Attorney, Agent, or Firm—Birch, Stewart, Kolasch & Birch, LLP

(57) ABSTRACT

The invention relates to a method for identifying objects, in which method electromagnetic radiation is imposed on the object (22–25) to be identified. According to the invention, such an identification component is used that includes a plurality of vibrating beams (4), and the electrical energy converted from said mechanical energy of the vibrating beams (4) is detected.

28 Claims, 4 Drawing Sheets

METHOD AND APPARATUS FOR CONVERTING ELECTROMAGNETIC ENERGY OF OBJECTS

FIELD OF THE INVENTION

The invention relates to a method for converting electromagnetic energy.

The invention also relates to an apparatus and component suited for converting electromagnetic energy.

BACKGROUND OF THE INVENTION

Conventionally, a barcode is most generally used for identification of objects. The barcode is generally read by means of a laser beam. Also passive/active code circuits or tag memories operating in the RF range have been developed. These components operate either in the low-frequency range (at about 100 kHz), medium-frequency range (at about 13 MHz), high-frequency range (at 400 MHz) or at the microwave range (at 2.46 GHz or 5.4 GHz). Most of the identification code or tag memory circuits are based the use of a "traditional" memory circuit. The circuit is energized from the scanning electromagnetic field. Also SAW (Surface Acoustic Wave) circuits have been employed at high frequencies. In a prior-art method of this type, the electrical pulse is converted into a surface acoustic wave that is reflected from metallic reflector elements fabricated on the surface of a piezoelectrically active material. Such a circuit is rather expensive to produce and the response effect is linear which makes remote identification of the circuit nonideal. Furthermore, it is difficult to tune the circuit so that the identification information covers a narrow frequency band.

A problem hampering the use of passive identification circuits based on conventional memory techniques is the limited detection range thereof. If low-frequency magnetic fields are employed, the field strength falls very rapidly (as the third power of distance). The voltage induced at the circuit may be increased by means of tuned circuits or transformers, but even this approach makes it extremely clumsy to extend the detection range up to 0.5 m. In contrast, microwave technology allows easy focusing of the scanning beam, whereby relatively large field strengths can be evoked even at larger distances. Unfortunately, it is difficult to generate a substantially high supply voltage by means of high-frequency fields. It must be noted, that the problem is not principally related to the transmission of a sufficient power, but rather, how to generate a sufficiently high supply voltage level for silicon microcircuits. Today, it is a generally established rule of thumb that a supply voltage of about 3 V cannot be generated at a distance of 10 m, which means that commercial firms active in the field are looking for other solutions to implement an identification transponder. The use of an SAW circuit is one example of such attempts.

Besides those described above, microwave power can be detected by means of a bolometer. While a bolometer is well suited for use in conjunction the short-wavelength bands of the electromagnetic spectrum, at still shorter wavelengths, e.g., at the microwave and millimeter wavelengths, the noise of the required front-end electronics becomes a definitely limiting factor.

It is an object of the present invention to overcome the disadvantages of the above-described techniques and to provide an entirely novel type of method and apparatus for converting electromagnetic energy.

SUMMARY OF THE INVENTION

The goal of the invention is achieved by virtue of using such a transponder component that comprises electromechanical vibrating elements such as beam capacitors that with the help of, e.g., an inductor, are tuned to a desired resonant frequency. Additionally, such a component includes means for converting mechanical energy back to electrical energy at a different voltage and/or frequency in regard to that of the electrical signal received by the component.

A preferred embodiment of the invention is based on the use of such a passive identification component that comprises electromechanical vibration elements, e.g., beam capacitors that are tuned to a desired resonant frequency with the help of an inductor, for instance. According to another preferred embodiment of the invention, a number of the capacitors can be electrically set into a passive state in order to provide each identification component with an identification code different from that of any other similar component.

A further preferred embodiment of the invention is suited for power measurement on the microwave and millimeter wave ranges and, for this purpose, is based on power measurement of an electromagnetic field by means of a micromechanical transducer, generally a silicon micromechanical transducer. Typically, the micromechanical transducer is made using a beam structure, and the mechanical state of the micromechanical structure is altered by means of electrical bending forces in order to increase its sensitivity and to tune the frequency range so that the measurement range can be changed. The micromechanical transducer is tuned either to the measured frequency or, alternatively, between the receiver antenna and the circuit containing the micromechanical transducer is advantageously adapted a chopper that switches on and off the microwave signal, advantageously at the resonant frequency of the mechanical circuit structure.

More specifically, the method according to the invention is characterized by what is stated in the characterizing part of claim 1.

Furthermore, the apparatus according to the invention is characterized by what is stated the characterizing part of claim 1.

The invention provides significant benefits.

A component made using surface micromechanical machining is cost-efficient to manufacture. In the embodiment according to the invention, the transmit and receive frequencies are arranged to be different from each other, which allows easy separation of the return signal from the transmitted signal. According to the invention, also the coding of the identification component can be made readily carried out using electrical means. The invention allows radio-frequency energy to be converted into such a form of electrical energy that is compatible with the voltage requirements of circuits fabricated using the silicon semiconductor technology.

By virtue of the invention, it is possible to design a mechanical element of a high quality factor (Q-value) for microwave power detection, whereby a clearly superior sensitivity over prior-art techniques particularly in the detection of field strengths at millimeter and microwave ranges is achieved. Moreover, the center frequency of the novel detector can be altered without any essential degradation of its quality factor.

If an RF field is modulated at a given frequency and this modulation exerts at the modulating frequency a force capable of evoking a micromechanical resonant vibration, the amplitude of vibration at the resonant frequency can be made so large that the associated electronic circuits becomes a nonlimiting factor to the noise, which will rather be determined by such variables as, e.g., damping of the micromechanical resonator by the surrounding gas atmosphere. It can be proven by calculations that micromechanical machining makes it possible to manufacture for the millimeter wave range (or equivalent RF range) a detector of a higher sensitivity than that offered by a bolometer.

BRIEF DESCRIPTION OF THE DRAWINGS

In the following, the invention will be examined in greater detail with the help of exemplifying embodiments illustrated in the appended drawings, in which.

DETAILED DESCRIPTION

Figure 1:
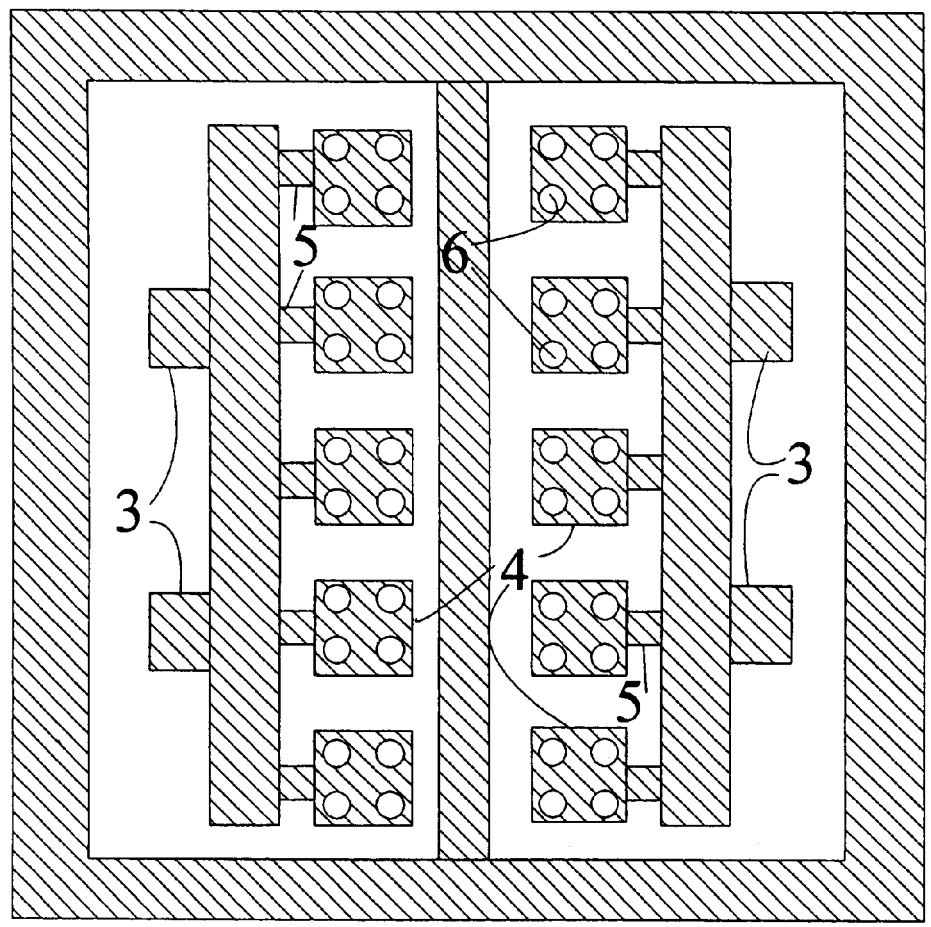
FIG. 1 shows a top view of an identification component according to the invention.

Now referring to FIG. 1, therein is shown the structure of an identification component according to the invention in a top view. The component comprises ten beams 4 having a conducting area made thereunder. The beams 4 are provided with perforations to reduce the weight of the structure, and the beam stem portions 5 are narrowed to improve the sensitivity of the structure. Contact areas of electrodes are generally denoted by reference numeral 3. The beams 4 and the conductors connected thereto are advantageously implemented as throughout metallized layers to reduce the series resistance thereof to a minimum. In the illustrated embodiment, the capacitive current is arranged to pass from the left-side vibrating beams to the right-side vibrating beams via the bottom layer.

Figure 2:
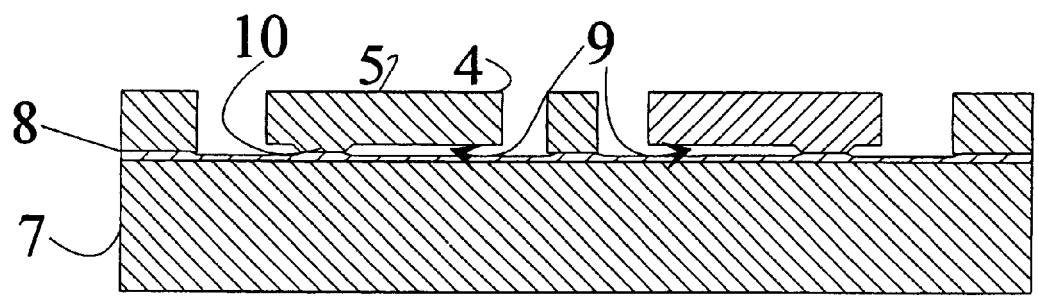
FIG. 2 shows a longitudinally sectioned side view of the component of FIG. 1.

As shown in FIG. 2, the component is fabricated on a substrate 7 having an insulating layer 8 made thereon. The insulating layer may comprise two separate sublayers, whereby the etchable sublayer may have a thickness of about 100 $\mu$m and the solid sublayer may be 200–300 $\mu$m thick. The solid insulating sublayer may also be grown in a later step by way of oxidizing the surface of the silicon substrate 7. Between the conducting area electrodes (not shown) of the substrate 7 and undersides of the beams 4 is formed a capacitor electrode gap 9 that is made as narrow as possible, typically in the order of about 100–500 nm. The area of the beam 4 (as seen from the viewing direction of FIG. 1) may be small, e. g., less than 100 $\mu\mu m^2$ in order to achieve a higher mechanical resonant frequency. To further increase the resonant frequency, the area of the beams 4 may be subjected to an additional etching step during the fabrication of the circuit. Accordingly, the dimensions of the beams 4 and the structure of joints 10 connecting the beam to the substrate 7 determine the mechanical resonant frequency of each of these capacitors.

Each one of the beams 4 is dimensioned so that the mechanical resonant frequency of the beam is different from any of the other beams. Advantageously, the resonant frequency is made higher than 100 kHz, advantageously as high as 1 MHz. For instance, the resonant frequencies of the individual beams 4 can be selected to form, e.g., an arithmetic series as f, f(1+1/12), ..., f(1+i/12), ..., f(1+10/12).

The structure of the beams can be made such that desired ones of the beams 4 may be adhered by way of suitable electrical control signal to the insulating layer 8 for the purpose of setting the desired beams 4 into an inactive state, thus making it possible to perform reprogramming of the component identification code. In order to facilitate an element-specific deactivation, an arrangement must be made to allow the connection of each element separately to the deactivation voltage. While only ten vibrating elements 4 are shown in the diagrams, this simplification only serves to elucidate the idea of the invention. In practice, the number of these elements in an identification component is greater, typically in the order of several tens.

Figure 3:
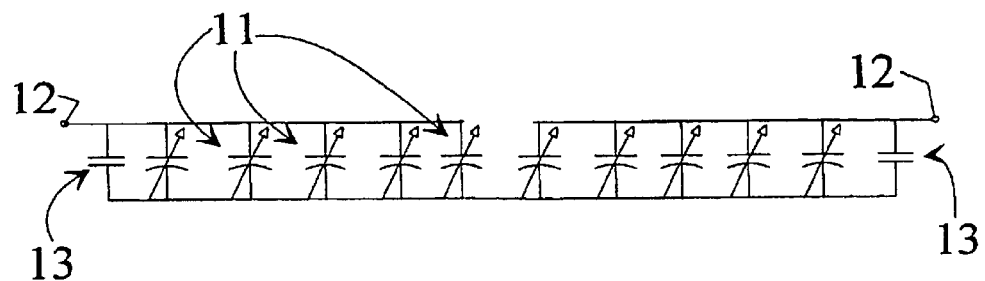
FIG. 3 shows an equivalent circuit diagram of component embodiment of FIG. 1.

In FIG. 3 is shown an embodiment, wherein the capacitors 11 formed between the beams 4 and the substrate 7 acting as the electrodes are connected in parallel. When an amplitude-modulated exciting signal is applied on this mechanical system, the capacitors 11 begin to vibrate and the energy of vibration is transferred between the antenna (not shown) and the capacitors 11 thus being converted from mechanical energy into electrical energy. The circuit is connected by its terminals 12 to the antenna.

In the following, there is described a practical example of the identification readout technique applicable to the structure shown in FIG. 2 or 3. Herein, typical operating frequencies are selected from the frequency bands allocated about 400 MHz, 900 MHz, 2.5 GHz and 5.2 GHz. By way of example, it can be assumed that there are generated (using modulation or other similar technique) two frequencies, 2.500 GHz and 2.501 GHz, which are launched over the air toward the transponder component. The transponder has an antenna system designed to excite a maximally large voltage over the micromechanical "capacitor" (in reality, there is an optimum voltage level that should not be exceeded). The antenna impedance matching is optimized in conjunction with the design of the micromechanical capacitor.

Resultingly, two high-frequency signals will be applied over each one of the capacitors 11. It is known that the force between the capacitor electrodes that can be written as the derivative of the capacitor energy in regard to the interelectrode distance is proportional to the square of the interelectrode voltage ($u^2$). Now using this composite signal in the equation of the element mechanical vibration, it can be seen that the transponder element is excited by a sum of the exciting signal components at about 5 GHz which is not capable of causing a vibrating motion (due to the excessively high frequency for mechanical vibration) and by a 1 MHz signal component (difference of exciting signals) which is capable of causing a vibrating motion. An assumption may now be made that only one of the transducer beams 4 has a mechanical resonant frequency of 1 MHz. Then, only this beam will be set in motion, whereby the ratio of the exciting force to the amplitude of motion is determined by such factors as the mechanical Q-value of the beam and is the frequency of the exciting force same as the resonant frequency of the beam. Once the beam is made to oscillate at 1 MHz, its capacitance is varied dynamically thus causing a phase modulation (or frequency modulation). Resultingly, there is formed an equivalent signal generator over the capacitance, whereby additional frequencies at 2.5 GHz+1

MHz, 2.5 GHz–1 MHz, 2.501 GHz+1 MHz and 2.501 GHz–1 MHz will be generated aside of the previously mentioned spectral components at 2.5 GHz and 2.501 GHz. All these frequencies are phase-modulated frequencies. As noted, the original input signal was amplitude-modulated. Hence the exciting frequencies can be produced by complete amplitude modulation or by using amplitude modulation, wherein the carrier is eliminated. In this manner the signal "bounced" back from the transponder component has a different modulation contains such frequency components that were nonexistent in the transmit signal, namely, 2.5 GHz–1 MHz=2.499 GHz and 2.501 GHz+1 MHz=2.502 GHz.

The process may be understood by considering a conventional amplitude-modulated signal that in the most general case contains three frequency components: the carrier and two sidebands. For this kind of signal, the component responds with a phase-modulated signal having a modulating frequency of 2f, where f is the frequency of amplitude modulation.

In the above-described example, the transponder component was excited by two frequencies only, which is minimum number of transmit frequencies that can be used for interrogating the beam. In practice, the readout of the component identification code requires changing the difference between the exciting frequencies or the use of multiple exciting frequencies (analogous to serial vs. parallel readout of data). Moreover, even a single beam element can be interrogated using more than two frequencies—e.g., interrogating with an amplitude-modulated signal involves three spectral frequency components although the number of actual signal frequencies is two: that of the carrier and that generating the two sidebands. The situation may become more complicated when the phase modulation generates a greater number of sideband frequencies, but if a "moderate" modulation index is used, only the first-order sidebands are significant.

The transponder has a conventional antenna portion optimized for maximum coupling efficiency of electromagnetic energy into the vibrating motion of the beam element. The practical design is an antenna with an integrated impedance transformer optimized to produce a maximally strong phase-modulated transpond signal.

A common antenna can be used for both the incoming (exciting) signal and outgoing transpond signal, since at 2.5 GHz for instance the electrical bandwidth of an antenna is at least 10 MHz and most )probably, even wider. As the resonant frequencies of mechanical elements in practice invariably remain smaller than 1 MHz, all the necessary sidebands can be received over the antenna bandwidth. Hence, a simple tuned loop or dipole antenna with an impedance transformer is sufficient for the needs of the identification component according to the invention.

Figure 4:
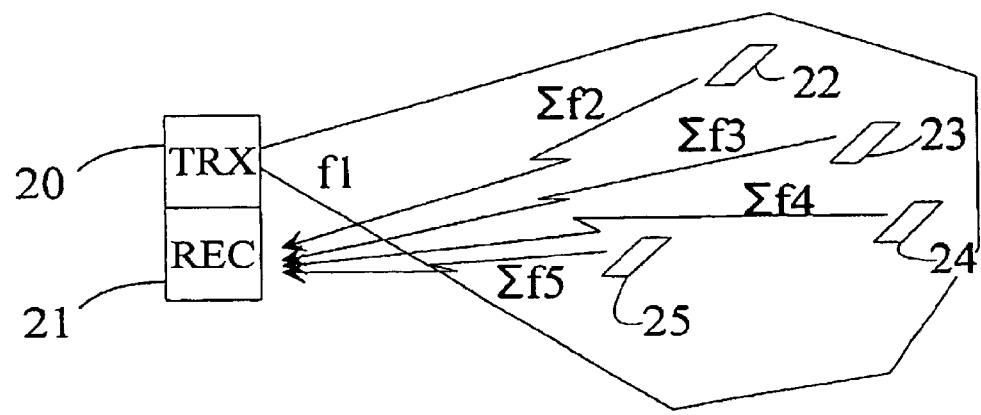
FIG. 4 shows schematically an apparatus according to the invention.

In FIG. 4 is shown an apparatus comprising a transmitter 20 serving to launch the exciting signal and a receiver 21 serving to receive the transpond signal evoked by the exciting signal. The transmitter 20 sends, e.g., an amplitude-modulated broadband interrogating signal over a frequency band $\Sigma f1$ (or, alternatively, at a plurality of discrete spot frequencies) and, according to the coding of the identification component 22–25, the receive signal is comprised of spectral signal components $\Sigma f1$–$\Sigma f5$ that represent the response of the identification components 22–25 to the exciting signal emitted by the transmitter. As described above, depending on its mechanical properties and a possible latching state, each interrogated identification component 22–25 reacts by responding through sending a signal comprising a number of spectral frequency components. The spectral frequency components are detected at a receiver 21 and the interrogated object can be identified by the combination of the received spectral frequency components.

Next, the theoretical background of the invention is described:

The basics of the invention can be formulated mathematically as follows. The beam element motion is governed by the equation:

$$m\frac{d^2 x}{dt^2} + \eta\frac{dx}{dt} + kx = F = \frac{d}{dx}\left(\frac{1}{2}CU^2\right) = \frac{d}{dx}\left(\frac{1}{2}\frac{\varepsilon A}{l}U^2\right) = -\frac{1}{2}\frac{C}{l}U^2$$

where m is the mass of the beam pendulum, k is the spring constant, $\eta$ is the coefficient of friction and U is the voltage over the capacitance C. If two signals at closely adjacent frequencies are applied over the capacitance (for simplicity, an assumption is made that the signal amplitudes are equal), the above force equation can be written in the form:

$$F = -\frac{1}{2}\hat{u}^2\frac{C}{l}(\sin_{\omega_1 t} + \sin_{\omega_2 t})^2$$
$$= -\frac{1}{4}\hat{u}^2\frac{C}{l}(2 + \sin 2_{\omega_1 t} + \sin 2_{\omega_1 t} + \sin(\omega_1 - \omega_2)t + \sin(\omega_1 + \omega_2)t)$$

In practice, the only force terms of greater significance are those imposed by the DC voltage component and the difference frequency component. The other force terms do not invoke a motion of the beam. Then, the force setting the beam into a motion can be written as:

$$F = -\frac{1}{4}\hat{u}^2\frac{C}{l}(2 + \sin(\omega_1 + \omega_2)t)$$

If $(\omega_1 - \omega_2 = \omega_{res}(\omega_2 > \omega_1)$, the equation of beam motion can be written as:

$$\eta\frac{dx}{dt} = -\frac{1}{4}\hat{u}^2\frac{C}{l}\sin(\omega_1 - \omega_2)t$$

The beam mass and spring constant are eliminated, because the beam swings at its resonant frequency. Resultingly, the equation can be written as:

$$x(t) = \frac{1}{4}\hat{u}^2\frac{C}{\omega_{res}\eta l}\cos\omega_{res}t$$

As the mechanical quality factor of the beam is high (due to the small value of the friction term $\eta$), the amplitude of the beam motion is large and takes place in a sinusoidal manner. By writing the interelectrode distance of the capacitor as $l_c = l + x$, the impedance of the capacitance can be written as:

$$Y(t) = \frac{1}{\omega C(t)} = l\frac{1 + x(t)/l}{\omega\varepsilon A} = \frac{1}{\omega C}\left(1 + \frac{1}{4}\hat{u}^2\frac{C}{\omega_{res}\eta l^2}\cos\omega_{res}t\right)$$

Then, the current passing through the time-dependent capacitance is:

$$I(t) = \frac{U(t)}{Y(t)} = \frac{\omega C\hat{u}(\sin\omega_1 t + \sin\omega_2 t)}{1 + \frac{1}{4}\hat{u}^2 \frac{C}{\omega_{res}\eta l^2}\cos\omega_{res} t} \approx$$

$$\omega C\hat{u}(\sin\omega_1 t + \sin\omega_2 t)\left(1 - \frac{1}{4}\hat{u}^2 \frac{C}{\omega_{res}\eta l^2}\cos\omega_{res} t\right)$$

The equation of current may further be written as:

$$I(t) = \omega C\hat{u}\left[\left(1 - \frac{E_c}{2l^2}\frac{Q_m}{k}\right)(\sin\omega_1 t + \sin\omega_2 t) - \frac{E_c}{2l^2}\frac{Q_m}{k}(\sin(\omega_1 - \omega_{res})t + \sin(\omega_2 + \omega_{res})t)\right]$$

where $E_c$ is the average electrostatic energy $E_c$ stored by the capacitance:

$$E_c = \frac{1}{2}Cu_{rms}^2 = \frac{1}{4}C\hat{u}^2.$$

The current now comprises two new frequency components: $\omega_1 - \omega_{res}$ and $\omega_{2+\omega res}$. (assuming that $\omega_2 > \omega_1$).

If excitation of the transponder component at frequencies $\omega_1$ and $\omega_2$ makes the component transpond at these frequencies, it can be inferred that the component is tuned to resonate at the difference frequency $\omega_1 - \omega_2$. By using an additional third transmit frequency, it is possible to interrogate the second mechanical resonance, etc. The bits of the transponder component identification code can be read in parallel at multiple frequencies or by using a time-division readout technique. It is also possible to use a combination time-frequency multiplex technique.

Figure 5:
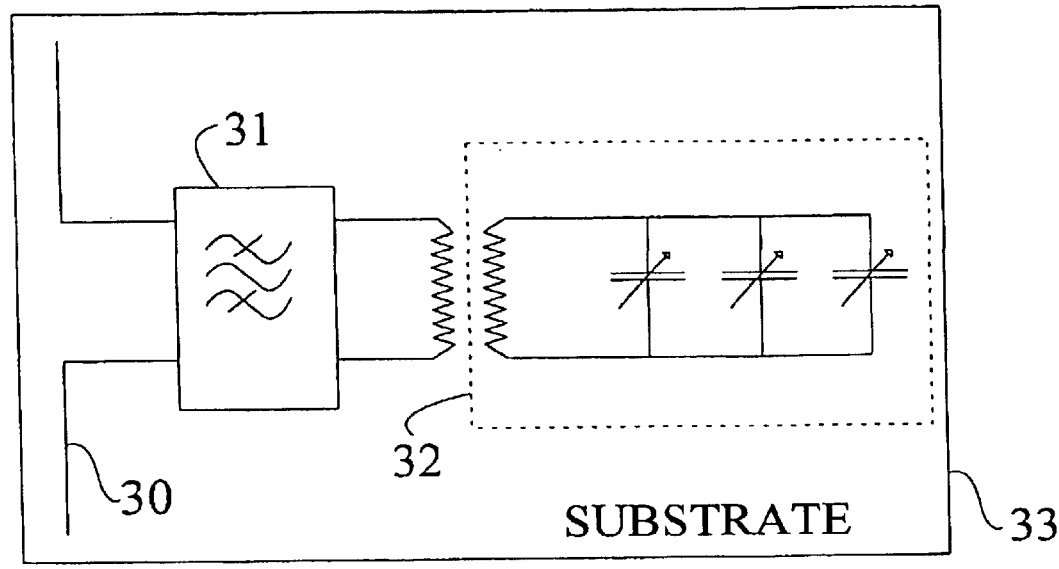
FIG. 5 shows schematically a combination of an identification component according to the invention with an antenna.

Tuning of the mechanically vibrating capacitor allows both the voltage and, resultingly, also the motion amplitude to be increased at the mechanical capacitor. This requires that, e.g., in the manner shown in FIG. 5, the antenna circuit about the antenna element 30 must be complemented with a possible bandpass element 31, and the circuit tuning must be implemented so that the transponder portion 32 behaves as a real impedance when viewed from the direction of the antenna circuit. Typically, the integrated antenna circuit is located on an essentially planar laminate substrate 33.

As the fabrication of contacts on a small silicon chip is a difficult task, it is advantageous to provide the chip with a coil to which energy from the antenna circuit is coupled inductively. The coil may also simultaneously be utilized in the tuning of the transponder capacitor portion to the carrier frequencies.

If an AC voltage is connected over the transponder elements and simultaneously a DC voltage is applied between the beam and the substrate, the differential equation of motion of the beam 4 can be written as:

$$m\frac{dX^2}{d^2t} + \eta\frac{dx}{dt} + kx = \frac{1}{2}\frac{\varepsilon A(U_{dc} + U_{ac}\sin\omega t)^2}{(l_0 - X)^2}$$

Assuming that the quality factor of the beam 4 is high, only a sinusoidal motion is possible, whereby:

$$X = X_{dc} + X_{ac}\sin(\omega t + \rho)$$

Substitution with the help of this formula in the differential equation of beam motion allows the static component of force to be solved in the form:

$$\langle F \rangle = \frac{\varepsilon A U_{dc}^2}{2l_0^2(1-x_{dc})^2}\frac{1}{2\pi}\int_0^{2\pi}\frac{(1+\upsilon\sin t)^2}{(1-\varsigma\sin(t+\rho))^2}dt \approx$$

$$\frac{\varepsilon A U_{dc}^2}{\pi l_0^2(1-x_{dc})^2}\left(\frac{e^{7.5\varsigma}}{90}+1\right)\left(2\upsilon\left(\frac{\pi}{2}-\rho\right)+\frac{\pi}{2}\right)$$

where $x_{dc} = X_{dc}/l_0$, $x_{ac} = X_{ac}/l_0$, $\upsilon = U_{ac}/U_{dc}$, $\varsigma = x_{ac}/(1-x_{dc})$ If $\varsigma > 0.7$ and $\upsilon << 1$, the equation can be written as:

$$\langle F \rangle \approx \varepsilon A\left(\frac{U_{dc}e^{3.75\varsigma}}{13\ l_0(1-x_{dc})}\right)^2$$

A first-order model allows the beam motion amplitude to be solved as:

$$x_{ac} = \frac{Q_m\varepsilon A U_{dc}U_{ac}}{m\omega_m^2 l_0^3}$$

where $Q_m$, is the mechanical quality factor, $\omega_m$ is the mechanical resonant frequency and m is the mass of the beam. On the other hand, the voltage $U_{dc}$ may not be allowed to rise above a mechanically limiting voltage that can be solved from the equation:

$$U_c = \frac{2}{3}\sqrt{\frac{2kl_0^3}{3\varepsilon A}}$$

Substitution of this critical limiting voltage in the beam motion equation gives:

$$x_{ac} = \frac{2}{9}\frac{Q_m}{\omega_m}\sqrt{\frac{6C}{m}}\frac{U_{ac}}{l_0}$$

Respectively, the static force term can be solved as:

$$\langle F \rangle = \left(\frac{e^{3.75\varsigma}}{24(l-x_{dc})}\right)^2 kl_0$$

If the dynamic beam motion amplitude $x_{ac}$ is large, the beam will be subjected to a strong static force component. The latter force component drives the beam against the substrate wall. This means that resonating beams will become latched immobile if the DC bias voltage is below the above-mentioned critical voltage. Resultingly, a desired one of the vibrating cantilever pendulum beams can be forced to latch to the substrate provided that the spring constant and the forces acting at the substrate surface as the major factors are arranged to permit such a latching of the transponder element.

Without departing from the spirit of the invention, either a single-beam identification component or, alternatively, one of the beams of a multibeam component can be assigned to indicate the status of the component on an object. The status information may be, e.g., theft of the object, clearing information of given process step or some other information related to the object status. Accordingly, in the case that the component is used as an antitamper indicator, an electrical field may be applied to drive said individual beam to latch to the substrate structure so that the component structure cannot be reactivated by way of, e.g., tapping or shaking. As the reactivation of the component from such a latched state can be made by electrical means only, this type of embodiment according to the invention is particularly well suited for such applications as library object theft protection, wherein the transponder component must be reliably activated and deactivated a great number of times.

The component construction according to the invention would also be suitable for use as a remote-readable acceleration transducer application, wherein each finger of the hand carries an acceleration transducer identifiable by an individual code different from that of the other transducers thus allowing the transducer information to be used for position location of the fingers. By virtue of this arrangement, either a keyboard or, alternatively, a joystick could be made redundant.

Figure 6:
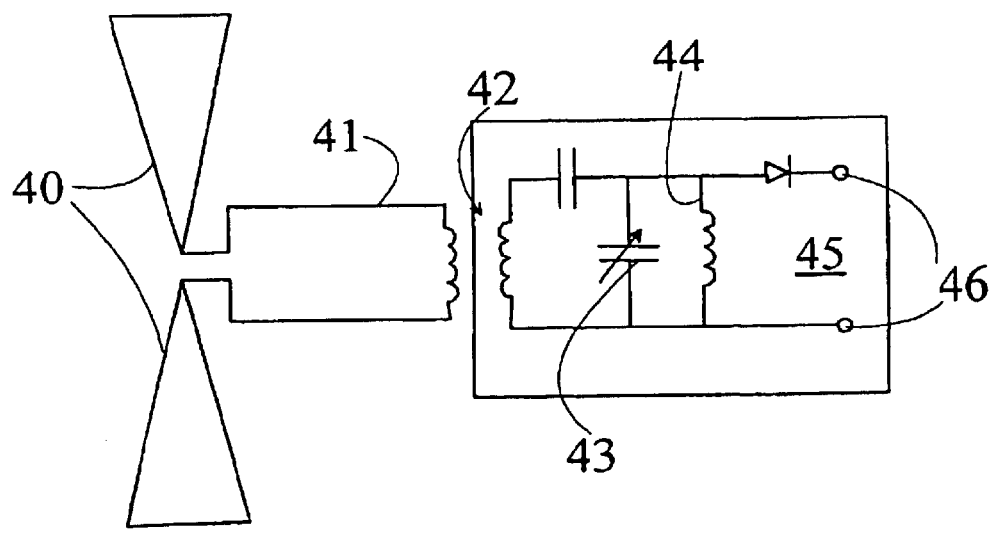
FIG. 6 shows schematically a component according to the invention adapted to perform an in-circuit conversion of received RF energy into electrical energy at the supply voltage level of the component circuitry.

In FIG. 6 is shown an application suitable for use as a so-called RF power supply, by means of which the energy of an incident RF field can be converted to DC power at a suitable supply voltage level for microcircuits. The circuit configuration comprises an antenna 40 that is tuned to the RF band to be received and is connected to a matching circuit 41. The antenna 40 with its matching circuit 41 capture the energy of the incident RF field and transfer the energy inductively to a vibrating-element 45 over a transformer 42. The micromechanical vibrating-element 45 may comprise, e. g., a cantilever-beam capacitor 43 that is tuned to the incoming frequency by means of a tuning circuit 44. Thus, the received RF energy can be made to induce the moving portion of the vibrating-element to undergo a pendulous vibration at a preset frequency. To the moving portion of the vibrating-element capacitor component 43 is applied a static electrical charge. Resultingly, the motion of the charged capacitor generates electrical energy that can be recovered at terminals 46 for being taken forward to the supply voltage portion of the associated electrical circuit.

The operation of the component shown in FIG. 6 has the following theoretical background.

Referring to the circuit diagrams of FIG. 6, therein is examined an application in which mechanical pendulous structures are used for either generating an RF transponder identification code or generating a DC voltage sufficiently high for use as a supply voltage. The element can be assumed to behave like a mechanical pendulum with a mass m, spring constant k and coefficient of friction η. For simplicity, the pendulum can be construed to be a planar capacitor having a bias charge Q. The, equation of pendulous motion can be written as:

$$m\frac{d^2x}{dt^2} + \eta\frac{dx}{dt} + kx = F = -\frac{d}{dx}E = -\frac{d}{dx}\left(\frac{1}{2}C(x,t)\left(\frac{Q}{C(x,t)} + U\right)^2\right)$$

where E is the electrostatic energy and C(x,t) is the capacitance which is dependent on time and the interelectrode distance 1−x. For a planar capacitor, the capacitance can be written as $C(x,t)=\epsilon A/(1-x)$. If the pendulous beam is excited by a high-frequency voltage waveform $$U = \hat{V}_{rf}\left(\sin\left(\omega_{rf} + \frac{1}{2}\omega_m\right)t + \sin\left(\omega_{rf} - \frac{1}{2}\omega_m\right)t\right),$$

it can be seen that $$F = -\frac{1}{2}\frac{d}{dx}\left(\left(Q + \frac{\epsilon A}{l-x}U\right)^2\right) = \frac{1}{2}\frac{\epsilon A}{l^2}U^2 = \frac{1}{2}\frac{\epsilon A}{l^2}\hat{V}_{rf}^2(\sin\omega_m t + \text{extra})$$

where the term extra comprises both a static component and a microwave high-frequency component. The static term causes a slight bending of the beam, but the high-frequency term has no effect on the beam as the mechanical resonant frequency of the beam is substantially smaller than the frequency of the applied exciting voltage.

Herein, the resonant frequency of the beam can be assumed to be $\omega_m$. If the exciting force is that given above, the equation of beam motion can be written as:

$$x(t) = \frac{\epsilon A \hat{V}_{rf}^2}{2\omega_m \eta l^2}\sin\omega_m t = \frac{C_0 \hat{V}_{rf}^2 Q_m}{2kl}\sin\omega_m t$$

The quality factor of the mechanical resonator is given by the equation:

$$Q_m = \frac{\omega_m m}{\eta}, \quad \text{where } \omega_m = \sqrt{k/m}$$

As the pendulum is biased by a charge, an AC output is obtained therefrom:

$$u_{ac} = \frac{Q}{C_0 + C(t)} \approx \frac{Q}{C_0}\frac{l}{l-x(t)} = -\frac{Q}{C_0}\frac{x(t)}{l} = \frac{Q\hat{V}_{rf}^2 Q_m}{2kl^2}\sin\omega_m t$$

To maximize the conversion efficient, the output circuit of the pendulum must be tuned. At best, this operation will raise the voltage at the circuit output by a factor of $Q_s$, where $Q_s$ is the quality factor (about 10–30) of the tuning circuit. The bias charge applied on the beam causes a displacement thereof. Obviously, the displacement may not be allowed to be excessively large. Assuming a maximum displacement value of ½l, the quality factor is:

$$Q = \sqrt{kl^2 C_0}$$

By substituting this in the previous equation, the output voltage will be:

$$u_{ac} = \frac{1}{2}\hat{V}_{rf}\sqrt{\frac{\hat{V}_{rf} C_0}{l^2 k}}Q_m\sin\omega_m t = \frac{1}{3}\hat{V}_{rf}\frac{\hat{V}_{rf}}{V_{pi}}Q_m\sin\omega_m t$$

If the vibrating beam is tuned with the help of a coil, the output voltage can be increased by a factor of Q. Then, the open-circuit output voltage can be written as:

$$u_{ac} = \frac{1}{3}\hat{V}_{rf}\frac{\hat{V}_{rf}}{V_{pi}}Q_s Q_m\sin\omega_m t$$

It can be seen from this equation that the voltage conversion is principally based on making the micromechanical structure such that $V_{pi}$ is relatively s mall (0.1–1V) and that the component is fabricated so as to make its mechanical quality factor maximally large (1000–10 000). Obviously, no electrically tunable circuit can offer such a high quality factor value. At large distances, $\hat{V}_{rf}$ may remain smaller than 10 mV. Assuming that $V_{pi}=1$ V $Q_s=30$, and $Q_m=1000$, the equation gives $u_{ac}=3$ V. As the output impedance of the circuit is high, the output power remains relatively low. At larger distances, the output power is in the order of 10 $\mu$W maximum. In practice, this means that the transponder code readout in a reliable manner takes longer the farther away the transponder component is from the transmitter and the lower the power level at which the circuit is operated. However, if the microwave power emitted by the transmitter is efficiently focused, it may be as high as 1 mW over the capture area of the component antenna at as large a distance as up to 10 m.

Figure 7:
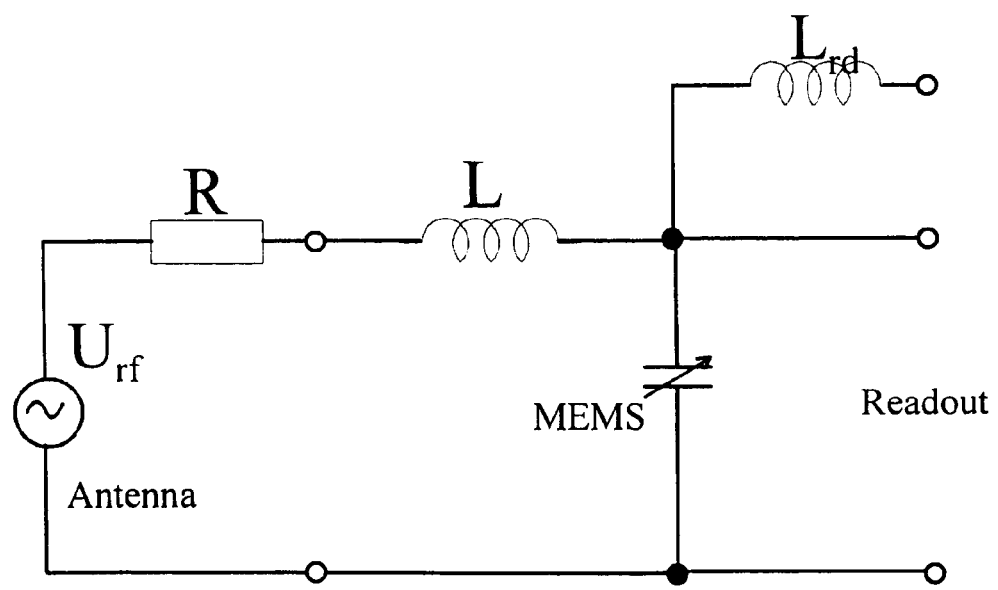
FIG. 7 shows a block diagram of a transducer embodiment according to the invention for power level measurement at the microwave and millimeter wave ranges.

Next, reference is made to FIG. 7 to elucidate a micromechanical measurement application at microwave and millimeter wavelengths.

The basic situation may be such that microwave power P is applied to a micromechanical capacitor C from an impedance R which is tuned with the help of an inductor L. It may be further assumed that overall loss component of the LC circuit is equal to the output impedance of the antenna circuit. The equivalent circuit of the system thus configured is shown in FIG. 7. Herein, the voltage source is $U=\sqrt{2PR_{eq}}$ and the equivalent noise temperature of the resistive component is $T_{eq}=(T_{rad}+T_b)/2$, where $T_{rad}$ is a temperature term dependent on the radiation impedance and the temperature of the antenna and $T_b$ is the temperature of loss components of the LC circuit elements. In practice, $T_b$ is almost equal to the "physical" temperature of the measurement transducer and $T_{rad}$ is chiefly determined by the own dissipation losses of the antenna. In an optimal situation, $T_{rad}$ is dependent on the object temperature only and, e.g., in space applications become as low as 3 K which is equal to the background temperature of the space in the universe. The quality factor of the system is $Q_s = \omega_{rf} CR_{eq}$. Then, the voltage imposed over the capacitor may be written as:

$$U_C^2 = 2PR_{eq}Q_s^2 = \frac{2Q_s^3}{\omega_{rf}C}P = \frac{2Q_s^2}{\Delta\omega_{rf}C}P$$

where $\Delta\omega_{rf}=\omega_{rf}/Q_s$ is the bandwidth of the microwave radiation to be measured. The total fluctuation of the signal due to electrical losses may be written as:

$$\langle U_{noise}^2\rangle = \frac{k_b(T_{rad}+T_b)}{2C}$$

The motion of the micromechanical "pendulum" is determined by the differential equation:

$$m\frac{d^2x}{dt^2}+\eta\frac{dx}{dt}+kx=F(t)$$

where m is the mass of the moving electrode, $\eta$ is a loss factor and k is the spring constant. The value of x gives the displacement of the moving electrode from its equilibrium position and F(t) represents the sum of the mechanical and electrostatic forces. If an electrode structure is used operating in the piston mode, the voltage U causes a force $F=\frac{1}{2}CU^2/l$, where l is height of the interelectrode gap.

Assuming that the inaccuracy in the measurement of the force caused by the imposed voltage is caused by the voltage fluctuation at the micromechanical component, the force equation can be written as:

$$\frac{1}{2}\frac{C}{l}(U_C+U_{noise})^2 = F_n$$

where the autocorrelation function of the force noise is $\langle(F_n(t)*F_n(t-))\rangle=2 k_\beta T_b\eta\delta(t)$ and the spectral power density thereof is $S_F=4k_\beta T_b\eta$. The electrical noise $U_{noise}$ has a total fluctuation $\langle U^2_{noise}\rangle=k_\beta T_{eq}/C$. If a chopper integrated to the system does not alter the system equivalent temperature, the force component caused by the thermal noise is a time-independent static constant. The present analysis can ignore the noise component stemming from the thermal noise as its effect remains in most cases smaller than the mechanical noise component.

Hence, assuming that the fluctuation of the mechanical dissipation is the major limiting factor, the smallest measurable RF power can be written as:

$$\Delta P = \frac{\omega_{rf}l}{Q_s^3}\sqrt{4k_BT_bm\Delta\omega_m} = \frac{\omega_{rf}}{Q_s^2}\sqrt{8k_BT_b\frac{E_k}{Q_m}}$$

where $E_k=\frac{1}{2}kl^2$. Herein, the coefficient of friction q of the micromechanical component has been expressed with the help of the mechanical quality factor $Q_m$ by the formula $\eta=m\omega_m/Q_m$. Additionally, the resonant frequency of the micromechanical cantilever beam has been expressed with the help of the coupling factor and beam mass by the formula $\omega_m=\sqrt{k/m}$ that is valid for situations of a relatively high quality factor. The mechanical quality factor determines the bandwidth of the measurement by the formula $\Delta\omega_m=\omega_{m/Q_m}$ and the RF bandwidth by the formula $\Delta\omega_{rf=\omega rf}/Q_s$. Obviously, on one hand, the measurement resolution is limited by the RF bandwidth and, on the other hand, by the information transfer bandwidth in the same manner as is known from diode detectors. The reason why the electrical quality factor appears in the equation is that the quality factor of the LC-circuit is most plausibly dictated by the effective electrical quality factor representing the mechanical dissipation losses. In this case, the detection resolution would only be limited by the performance of the micromechanical component. It may even be construed that the equation can be simplified into a form containing the product of the input and output bandwidths and the thermal energy as its sole terms.

Assuming that m=$10^{-7}$ kg, l=$10^{-8}$ m, $\omega_{rf}$=2$\pi$·200 GHz, $\Delta\omega_m$=2$\pi$·1 kHz, $Q_s$=30 and $T_b$=300 K, the equation gives $\Delta P\approx$1.2 pW/$\sqrt{Hz}$. With the additional measures of cooling the micromechanical component to 70 K, allowing 10-fold narrower information bandwidth, reducing the beam mass to 10 $\mu$g and narrowing the beam interelectrode gap from 100 nm to 50 nm, the computations give $\Delta P\approx$0.1 pW/$\sqrt{Hz}$. While the power detection threshold is difficult to bring below this value, the analysis anyhow shows that in principle the micromechanical techniques are suitable for producing an RF power detector having a sensitivity in the same order of or even better than that offered by a microbolometer.

Up to this point, the sensitivity of a micromechanical detector has been examined under a static condition. It has been assumed that the measurement of the capacitance value can be made so that no additional noise is involved. In practice, it is advantageous to compensate for the 1/f noise by means of complementing the system with a chopper operating synchronized to the resonant frequency of the micromechanical detector. The chopper induces a dynamic force on the micromechanical beam that, due to the high Q-value of the vibrating beam, causes a large-amplitude motion thereof. This arrangement improves signal detection, because the static charge imposed on the beam can thus give rise in the vibrating beam to an AC voltage that can be detected without any additive noise component being caused thereon by the detection circuit electronics.

The detection resolution will be the better the smaller the interelectrode gap can be made. The inventors have developed a method allowing an AC current to be employed for reducing the interelectrode gap as small as to one tenth of its fabricated width. Thus, by virtue of the current drive technique, the resolution threshold of a micromechanical detector can be improved in a substantial manner. The current passing through the detector in the current-drive mode may also be utilized for sensing the beam position or motion.

The operation of the system can be understood by way an example. The RF signal to be measured may be assumed to have a frequency in the range from 260 GHz to 280 GHz. The signal is passed from a "wideband" antenna to a coil that tunes the micromechanical capacitor to a center frequency of about 270 GHz. The quality factor of the tuned circuit must be in the range of 10–30 to obtain a suitable RF bandwidth. A chopper may be provided between the antenna and the resonant circuit so that the RF signal can be switched on and off at a rate of, e.g., 1 MHz. The force component thus established at a frequency of 1 MHz onto the beam acts as a cyclic force that excites a large-amplitude mechanical motion if the mechanical resonant frequency of the beam is equal to 1 MHz. By way of "driving" through the beam capacitor an RF current at 100 MHz, it is possible to generate a static force on the beam such that allows the interelectrode distance to be reduced from, e.g., 0.5 µm to 0.1 µm. By adjusting this current, the beam capacitance and, hence, the center frequency of the received RF signal can be varied. This arrangement facilitates a spectral analysis of the signal being measured. In other words, the system operates as a low-resolution spectrum analyzer. The 100 MHz RF current generates a voltage over the electrodes that is in linear proportion to the displacement of the beam. Then, by measuring the 100 MHz voltage and phase-locking the same to the 100 MHz current signal, the beam motion at 1 MHz frequency can be measured. The resolution of the 100 MHz voltage measurement can be improved by tuning the micromechanical capacitor with the help of a coil to a resonance.

In the above description, a method is outlined allowing a microwave signal over the range of, e.g., 100–1000 GHz to be measured by means of a vibrating micromechanical beam. Also larger frequencies may be measured by the method. A single micromechanical component can be readily fabricated to integrate hundreds of transducer elements which makes it possible to use the method for the manufacture a camera for the microwave and millimeter wavelength bands. As the method offers a relatively high resolution and permits the measured frequency to vary in a very large range, extending in theory up to the limits of the visible light, the method can be utilized in a substantially large number of different applications.

What is claimed is:

1. A method for converting electromagnetic energy into mechanical energy, in which the electromagnetic energy is imposed on an identification component, the method comprising:

using the identification component which comprises at least one vibrating element capable of converting the electromagnetic energy imposed thereon into mechanical energy, and capable of converting the mechanical energy of the at least one vibrating element into electrical energy, wherein a wavelength of electromagnetic field of the electromagnetic energy is measured substantially in microwave or millimeter wavelength ranges, and wherein the at least one vibrating element is a micromechanical pendulum whose motion is determined by a differential equation $$m\frac{d^2x}{dt^2} + \eta\frac{dx}{dt} + kx = F(t)$$

where m is a mass of an electrode, η is a loss factor, k is a spring constant, x is a displacement of the electrode from its equilibrium position, and F(t) is a sum of the mechanical and electrostatic forces.

2. Method according to claim 1, wherein the at least one vibrating element during the measurement is adjusted from its quiescent position closer to its counterelectrode.

3. Method according to claim 2, wherein during the measurement, a position of the at least one vibrating element is further adjusted relative to its counterelectrode in order to vary the measurement frequency.

4. Method according to claim 2, wherein the at least one vibrating element is a cantilever beam.

5. Method according to claim 1, 2 or 3, wherein a plurality of said vibrating elements are arranged to implement a microwave camera detector element.

6. Method according to claim 5, wherein the plurality of said vibrating elements are silicon micromechanical elements.

7. Method according to claim 6, wherein the microwave camera detector element is implemented by arranging the silicon micromechanical elements into at least one of a linear array and a matrix.

8. A transducer apparatus for converting electromagnetic emission of radiation via mechanical energy into another form of energy, said apparatus comprising:

an identification component, which comprises:

at least one vibrating element capable of converting an electromagnetic energy imposed thereon into the mechanical energy, wherein the at least one vibrating element is a micromechanical pendulum whose motion is determined by a differential equation $$m\frac{d^2x}{dt^2} + \eta\frac{dx}{dt} + kx = F(t)$$

where m is a mass of an electrode, η is a loss factor, k is a spring constant, x is a displacement of the electrode from its equilibrium position, and F(t) is a sum of the mechanical and electrostatic forces;

means for converting the mechanical energy forward into a form of electrical energy; and means for measurement of power level at substantially microwave or millimeter wavelengths frequencies; and a transmitter for emitting a signal of electromagnetic radiation toward said identification component.

9. Apparatus according to claim 8, further comprising means for adjusting a position of the at least one vibrating element during measurement in order to vary the transducer sensitivity and/or measurement frequency.

10. Apparatus according to claim 9, wherein the at least one vibrating element is a cantilever beam.

11. Apparatus according to claim 8, wherein the at least one vibrating element is a cantilever beam.

12. An identification component for converting energy of electromagnetic radiation into another form of energy, comprising:

at least one vibrating element capable of converting the energy of the electromagnetic radiation imposed thereon into mechanical energy, wherein the at least one vibrating element is a micromechanical pendulum whose motion is determined by a differential equation $$m\frac{d^2x}{dt^2} + \eta\frac{dx}{dt} + kx = F(t)$$

where m is a mass of an electrode, η is a loss factor, k is a spring constant, x is a displacement of the electrode from its equilibrium position, and F(t) is a sum of the mechanical and electrostatic forces;
   means for converting the mechanical energy to electrical energy; and
   means for measurement of power level at substantially microwave or millimeter wavelengths frequencies.

13. Apparatus according to claim 12, further comprising means for adjusting a position of the at least one vibrating element during measurement in order to vary the transducer sensitivity and/or measurement frequency.

14. Apparatus according to claim 13, wherein the at least one vibrating element is a cantilever beam.

15. Apparatus according to claim 12, wherein the at least one vibrating element is a cantilever beam.

16. A method for converting electromagnetic energy, comprising:
   receiving the electromagnetic energy whose wavelength substantially measures in microwave or millimeter wavelength ranges; and
   converting the electromagnetic energy into mechanical energy using at least one vibrating element, wherein the at least one vibrating element is a micromechanical pendulum whose motion is determined by a differential equation $$m\frac{d^2x}{dt^2} + \eta\frac{dx}{dt} + kx = F(t)$$

where m is a mass of an electrode, η is a loss factor, k is a spring constant, x is a displacement of the electrode from its equilibrium position, and F(t) is a sum of the mechanical and electrostatic forces.

17. The method of claim 16, further comprising converting the mechanical energy into a response electrical energy.

18. The method of claim 17, wherein the conversion of mechanical energy into the response electrical energy is direct.

19. The method of claim 17, wherein the at least vibrating element is tuned to a predetermined resonant frequency.

20. The method of claim 19, wherein the response electrical energy is at a different voltage and/or frequency relative to the electromagnetic energy.

21. The method of claim 20, wherein the voltage of the response electrical energy is compatible with voltage requirements of circuits fabricated using silicon semiconductor technology.

22. An apparatus for converting electromagnetic energy, comprising:
   a receiver configured to receive the electromagnetic energy whose wavelength substantially measures in microwave or millimeter wavelength ranges; and
   at least one vibrating element configured to convert the electromagnetic energy into mechanical energy, wherein the at least one vibrating element is a micromechanical pendulum whose motion is determined by a differential equation $$m\frac{d^2x}{dt^2} + \eta\frac{dx}{dt} + kx = F(t)$$

where m is a mass of an electrode, η is a loss factor, k is a spring constant, x is a displacement of the electrode from its equilibrium position, and F(t) is a sum of the mechanical and electrostatic forces.

23. The apparatus of claim 22, wherein the at least one vibrating element is further configured to convert the mechanical energy into a response electrical energy.

24. The apparatus of claim 22, wherein the at least one vibrating element is a cantilever beam.

25. The method of claim 24, wherein the cantilever beam directly converts the mechanical energy into the response electrical energy.

26. The method of claim 22, wherein the at least vibrating element is tuned to a predetermined resonant frequency.

27. The method of claim 26, wherein the response electrical energy is at a different voltage and/or frequency relative to the electromagnetic energy.

28. The method of claim 27, wherein the voltage of the response electrical energy is compatible with voltage requirements of circuits fabricated using silicon semiconductor technology.

* * * * *